United States Patent [19]

Russak

[11] Patent Number: 4,513,943

[45] Date of Patent: Apr. 30, 1985

[54] PRESSURE MEDIUM ACTUATED SERVO-MOTOR SYSTEM

[75] Inventor: Steffen P. Russak, Winterthur, Switzerland

[73] Assignee: Sulzer Brothers Limited, Winterthur, Switzerland

[21] Appl. No.: 531,702

[22] Filed: Sep. 13, 1983

[30] Foreign Application Priority Data

Sep. 17, 1982 [CH] Switzerland ........................ 5510/82

[51] Int. Cl.³ .................... F16K 31/122; F15B 13/043

[52] U.S. Cl. .......................................... 251/31; 91/51; 91/52; 91/421; 91/443; 91/454

[58] Field of Search ..................... 91/443, 47, 52, 421, 91/51, 454; 251/31

[56] References Cited

U.S. PATENT DOCUMENTS

| | | | |
|---|---|---|---|
| 1,948,044 | 2/1934 | Myers et al. | 91/52 |
| 2,769,912 | 11/1956 | Lupfer et al. | 91/52 |
| 2,928,606 | 3/1960 | Lee | 91/52 |
| 3,277,791 | 10/1966 | Williams et al. | 91/52 |
| 3,665,806 | 5/1972 | Heath | 91/52 |
| 3,818,805 | 6/1974 | Johansson | 92/13.1 |

*Primary Examiner*—Robert E. Garrett
*Assistant Examiner*—H. Edward Li
*Attorney, Agent, or Firm*—Kenyon & Kenyon

[57] ABSTRACT

The servo-motor system is provided with an internal control line which communicates one control valve with a cylinder chamber which is connected to a control valve connected with an external control line. The internal control line permits the second valve to be actuated via the externally controlled control valve.

11 Claims, 12 Drawing Figures

PRESSURE MEDIUM ACTUATED SERVO-MOTOR SYSTEM

This invention relates to a pressure medium actuated servo-motor system.

Heretofore, various types of servo-motor systems have been known for use in various environments. For example, in order to actuate steam isolating valves, it has been proposed to provide a servo-motor system having a piston which is slidable in a cylinder to bound two chambers with individual lines from each piston chamber to a pressure medium source and individual lines from each piston chamber to a pressure medium sink. In addition, the system would have a control valve in one of the connecting lines to each piston chamber and a restrictor in the other connecting line to each piston chamber. Further, each of the two control valves would be connected via an external control line to a control station.

However, a disadvantage of such a system is that the control station requires two signal lines to the servomotor in order to move the piston from one position to another position.

Accordingly, it is an object of the invention to provide a servo-motor system that can be actuated via a single line.

It is another object of the invention to increase the reliability of a servo-motor system by using a single control line.

It is another object of the invention to provide a servo-motor system which is actuated via a single control line which is not loaded more heavily than if the system had two single signal lines.

Briefly, the invention provides a pressure medium actuated servo-motor system which is comprised of a cylinder in which a piston is slidably mounted in order to divide the cylinder into two chambers. In addition, a first line communicates one chamber with a pressure medium source while a second line communicates the chamber with a pressure medium sink. In like manner, a third line communicates the other chamber with the pressure medium source while a fourth line communicates this chamber with the pressure medium sink. Further, a first control valve is placed in one of the lines to the first chamber while a restrictor is placed in the other line to the chamber. In like manner, a second control valve is placed in one of the lines to the second chamber while a restrictor is placed in the other line to the second chamber.

In accordance with the invention, an external control line is connected to one of the control valves and an internal control line communicates the other control valve with the chamber which communicates with the first control valve for activation of the second control valve with pressure medium from the latter chamber.

The servo-motor system is constructed so that the second control valve is actuated by action of the first control valve. Hence, there is no need for a solenoid valve which may otherwise be relatively expensive and relatively sensitive to breakdown. Reliability of the system is also easier to obtain.

Since the second control valve can be made inexpensively and is less subject to a breakdown, a redundance circuit can easily be constructed.

In one embodiment, one chamber of the servo-motor may communicate via one control valve with the pressure medium source while the second chamber communicates via the second control valve with the pressure medium sink. This embodiment has the advantage that when the piston is in one end position, which can be chosen as the normal position and in which both control valves are closed, there is only a slight loss of pressure medium from the source via the first restrictor, the piston clearance and the second restrictor to the sink.

The piston may also be constructed to include a rear seat on one side for seating on a cover of the cylinder. This has an advantage then when the control valves are closed, the rear seat seal prevents a flow around the piston. Hence, no pressure medium is consumed when the piston is in one position.

The system may also be constructed so that one control valve is in a normally closed position when the system is in a normal position. These features advantageously increase reliability in that if the first control valve breaks, the servo-motor moves from the normal position into a safety position.

In order to further increase reliability, the first control valve is disposed in a line connected to the pressure medium sink. Thus, the servo-motor would move into the safety position even if the first control valve is completely destroyed and the pressure medium flows through the valve opening into the atmosphere.

In order to prevent the second control valve from being destroyed by external forces, this control valve may be disposed within the contours of the servo-motor system. In another embodiment, the servo-motor system may include a valve casing having the cylinder and a valve chamber which defines the pressure medium source incorporated therein while a piston rod is secured to the piston and passes into the valve chamber with a lid secured to the rod within the valve chamber for selectively closing the valve chamber. In addition, if at least one feed line connects the valve chamber with one of the chambers of the cylinder, there is usually no need for a special pressure medium source.

In still another embodiment, the system may have a lid on the second control valve for seating on a valve seat and, a piston connected to the lid with a pressure surface operative in a lid-closing direction for communicating with the chamber connected with the first control valve. In addition, the piston may be provided with a pressure surface on the lid side which is connected to the pressure medium source and a connecting place disposed beyond the valve seat and connected to the other piston chamber. In addition, a means is provided for biasing the lid in a closing direction. This particular construction is extremely simple and highly reliable.

These and other objects and advantages of the invention will become more apparent from the following detailed description taken in conjunction with the accompanying drawings wherein:

FIGS. 1*a* to 1*h* schematically illustrate eight different embodiments of a servo-motor system constructed in accordance with the invention;

Figure 1:
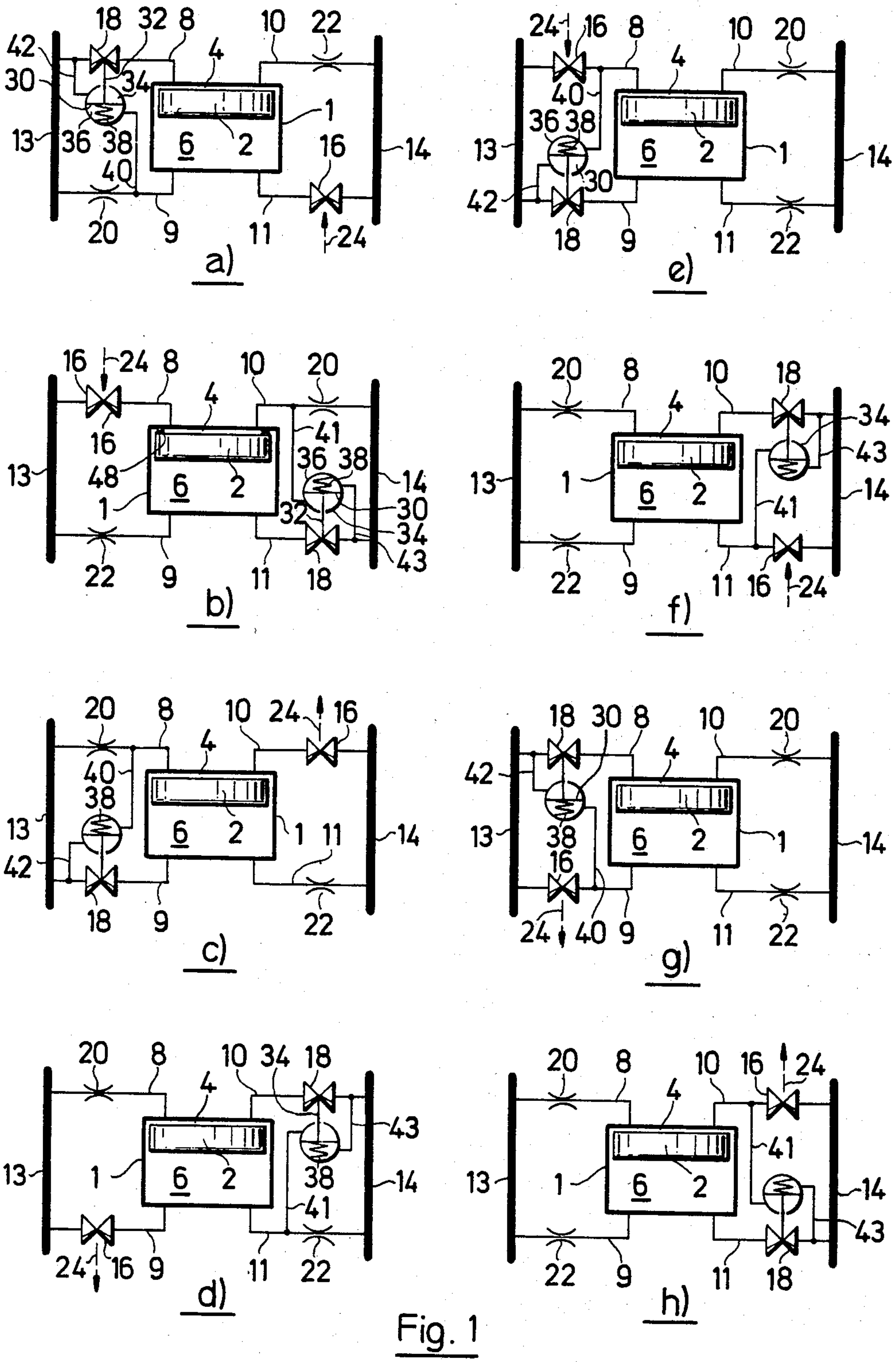

Of note, in the following description, the directional indication such as "top", "bottom", "left" and "right" relate to the illustrated views. The servo-motor system can, however, be oriented in any required direction in the various installations in which each system is installed.

Referring to FIG. 1*a*, the servo-motor system includes a cylinder 1 in which a piston 2 is slidably mounted in order to divide the cylinder into two chambers 4, 6. As shown, the piston is in a top or normal position, i.e. in the position which the piston occupies when the installation operates under normal conditions.

As indicated, each piston chamber 4, 6 communicates via a first individual line 8, 9, respectively, with a pressure medium source 13 and via a second individual line 10, 11, respectively with a pressure medium sink 14. In addition, a first control valve 16 is disposed in the line 11 to the chamber 6 while a second control valve 18 is disposed in the line 8 to the other cylinder chamber 4. The remaining lines 9, 10 each contain a restrictor 20, 22, respectively. In addition, the first control valve 16 is connected to an external control line 24.

As illustrated, the second control valve 18 is actuated by a diaphragm 30 via a rod 32. This diaphragm 30 divides a pressure chamber into a chamber 34 near the valve 18 and a chamber 36 remote from the valve 18. A compression spring 38 is also disposed in the chamber 36 in order to act on the diaphragm 30. In addition, the chamber 36 communicates via an internal control line 40 with the line 9 communicating with the cylinder chamber 6 i.e. with the cylinder chamber which communicates with the first control valve connected to the external control line 24.

FIGS. 1*b* to 1*h*, wherein like reference characters indicate like parts as above, illustrate similar embodiments of the servo-motor system. For example, the embodiments a, c, e and g have the chamber 36 communicating via the internal control line 40 with the cylinder chamber 4 or 6 with which the first control valve 16 is in communication. In the embodiments b, d, f and h, the chamber 34 communicates via an internal control line 41 with the cylinder chamber 4 or 6 which communicates with the first control valve 16.

In the first-mentioned embodiments, a, c, e and g of FIG. 1, chamber 34 communicates via a line 42 with the pressure medium source 13. In the second group of embodiments b, d, f and h in FIG. 1, chamber 36 communicates via a line 43 with the pressure medium sink 14.

Piston 2 acts via a piston rod (not shown in FIG. 1) on a movable part (not shown). The piston rod can project upwards, downwards or at both ends from cylinder 1.

The servomotor system in FIG. 1*a* operates as follows:

When the system is in normal operation, piston 2 is in a top end position. A digital plus signal is supplied via the control line 24 to the first control valve 16 and, as shown by the arrow at the control line 24, keeps the valve 16 closed. A pressure equal to the pressure of the pressure source 13 therefore builds up in the cylinder chamber 6 because medium is supplied through the restrictor 20. In chambers 34, 36 of the second control valve 18, the pressure is the same, and consequently spring 38 keeps valve 18 closed. As a result of pressure equalization via the restrictor 22, the pressure in cylinder chamber 4 is the same as in the sink 14. Since the pressure in the source 13 is much higher than in the sink 14, piston 2 is pushed with great force into the top end position.

If the digital plus signal in the control line 24 is switched off, e.g. by a safety device, the valve 16 opens. As a result, the pressure in the cylinder chamber 6 falls, depending on the size of the restrictor 20 and the flow cross-section of the line 11, to a value near the pressure of the sink 14. The pressure drop propagates through the inner control line 40 into chamber 36 and thus opens valve 18. The pressure in the cylinder chamber 4 therefore rises to a value near the pressure of the pressure-medium source 13. The piston 2 therefore moves rapidly to the bottom end position and remains there until line 24 receives another plus signal so that the valve 16 closes. When this happens, the pressure in the cylinder chamber 6 rises again to equal the pressure in the source 13. The pressure equalizes in chambers 34 and 36 and spring 38 can close valve 18. The pressure in chamber 4 therefore returns to the value in the sink 14 and piston 2 returns to the normal position shown.

One feature of the servomotor is that between the pressure medium source 13 and sink 14 there are two paths, in each of which a control valve and a restrictor are disposed in series. Each open control valve thus produces a flow of medium from the source 13 to the sink 14 which is restricted by the cross-section of the restrictor, resulting in a loss. A similar but much smaller loss of pressure medium occurs in the embodiments in FIGS. 1*a* to 1*d*, even when both control valves 16, 18 are in closed state, on the route extending via the two restrictors 20, 22 and the clearance between the piston 2 and the surrounding wall of the cylinder 1. The amount of leakage varies with the construction of the piston seal. As shown e.g. in FIG. 1*b*, the leakage can be completely suppressed by disposing rear seat 48 on the piston 2, the seat co-operating with a suitable surface e.g. a cover on the cylinder 1.

The system in FIG. 1*b* operates as follows. In normal conditions, valve 16 is kept closed by a plus signal in line 24 and valve 18 is also in the closed state. When the signal in line 24 disappears, valve 16 opens and the pressure in the chamber 4 rises and propagates via the internal line 41 into chamber 34 of valve 18. The resulting pressure difference across the diaphragm 30 overcomes the force of the spring 38, so that the valve 18 opens. The pressure in the cylinder chamber 6 decreases, so that the piston 2 moves to the bottom end position.

In the servomotor system in FIG. 1*c*, in contrast to the systems in FIGS. 1*a* and 1*b*, valve 16 and valve 18 are both open in the normal position, as shown by the arrow at line 24. When the external control signal ceases, valve 16 closes, the pressure in chamber 4 rises and so valve 18 also closes. Thus, the pressure in the cylinder chamber 6 falls and the piston 2 moves to the bottom end position.

In the embodiment in FIG. 1*d*, as in FIG. 1*c*, both control valves are open in the normal position, so that the pressure in the cylinder chamber 6 is higher than in the chamber 4. When the control signal in line 24 ceases, so that valve 16 closes, the pressure in chamber 6 and chamber 34 decreases whereupon valve 18 is closed by spring 38. As a result, the pressure rises in the chamber 4 and the piston 2 moves to the bottom end position.

In FIG. 1*e* valve 16 opens when the control signal in line 24 ceases and is normally in the closed state. In contrast to the previously discussed systems 1*a*–1*d*, valves 16 and 18 are in opposite positions, i.e. when valve 16 is closed, valve 18 is open and vice versa. When valve 16 opens from a normal position, pressure builds up in chamber 4 and chamber 36. The pressure on both sides of the diaphragm 30 are in equilibrium so that the spring 38 closes the valve 18. As a result, pressure medium escapes from the chamber 6 via the restrictor 22 and the piston moves to the bottom end position.

In FIG. *1f* as in FIG. *1e*, the control valves are in opposite positions. Valve 16 opens when the signal in line 24 ceases. When valve 16 opens, the pressure in chamber 6 and chamber 34 decreases. Valve 18 therefore closes so that chamber 4 is under pressure and piston 2 moves to the bottom position.

In the embodiments in FIGS. 1*g* and 1*h*, valves 16 are normally open. When the external control signal stops, they close. Thus, in each case, the second control valve 18 opens and the piston 2 moves to the bottom end position.

Figure 2:
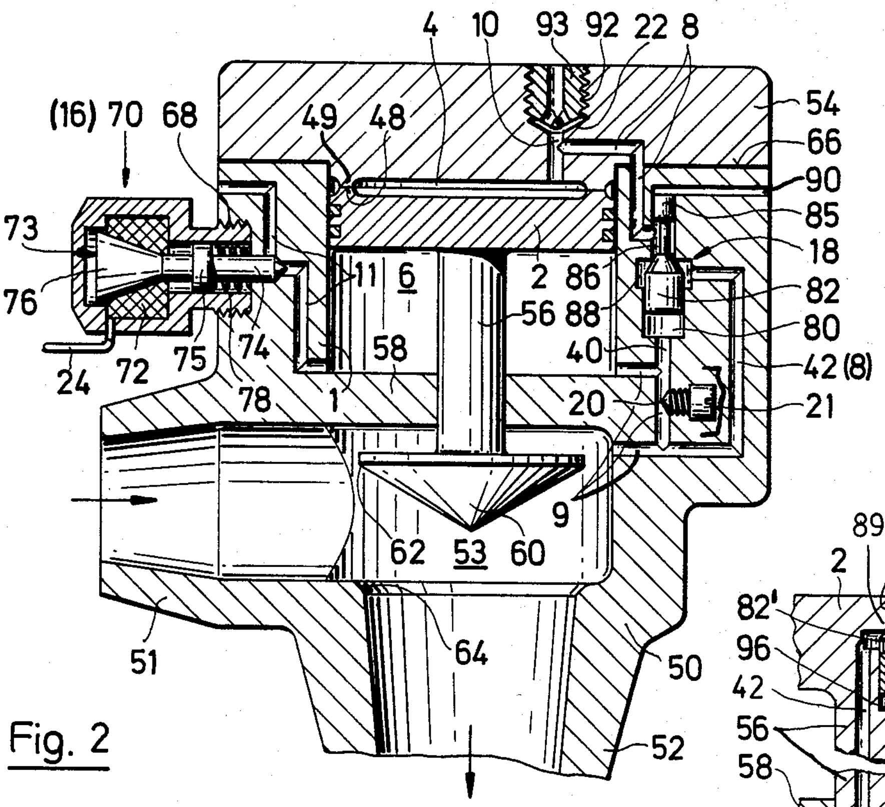
FIG. 2 illustrates an axial sectional view through a servo-motor system of simple construction in accordance with the invention.

In the embodiment in FIG. 2, the servomotor system is incorporated in a normally open valve. The valve includes a casing 50 which has an inlet connection 51 and an outlet connection 52 which casing co-operates with a cover 54 to form the cylinder 1 of the servomotor system in which a piston 2 is axially movable. A piston rod 56 is disposed on the bottom end face of piston 2 coaxially thereof, extends through the cylinder chamber 6 and the adjacent cylinder end 58 and has a lid 60 at one end extending into a valve chamber 53. A peripheral sealing surface 62 of the lid 60 co-operates with a valve seat 64 in the valve chamber 53.

The piston 2 has, on the side remote from the rod 56, a peripheral rear seat 48 which co-operates with a matching surface 49 in the cover 54. The cover 54 is secured in gas-tight manner by screws (not shown) to a top flange surface 66 of the valve casing 50.

The circuitry in the servomotor system in FIG. 2 is directly comparable with the variant in FIG. 1*a*. The connecting line 11, shown in FIG. 2 in the form of interrupted bores, extends from chamber 6 to the casing outer wall where the line has an open end. Line 11 is radially bored from the exterior to form a valve seat, the bore being surrounded by a tapped blind hole in which a connection 68 of a solenoid valve 70 corresponding to the first control valve 16 is screwed. Valve 70 comprises a part 73 which is axially movable inside a d.c. coil 72 and comprises a valve spindle 74, a collar 75 and an armature 76. A compression spring 78 bears on the bottom of the tapped hole and acts on collar 75.

Coil 72 is normally energized via a control line 24. Armature 76 is therefore attracted, thus pressing spindle 74 against the valve seat and blocking line 11.

When the current in the coil 72 is switched off, the spring 78 pushes the movable part 73 to the left, so that the line 11 opens.

In the wall part of housing 50 and on the right in FIG. 2, line 9 extends in a U-shape from the top region of the valve chamber 53 into the bottom region of the chamber 6. Valve chamber 53 forms the pressure-medium source.

Restrictor 20 comprises a screw 21 which extends radially into the line 9 and is adjustable by rotation of the screw. Of note, the bores shown in the plane of the drawing actually extend partly in three dimensions. Consequently, the screw 21 can be adjusted from the exterior.

The line 9 merges at the top into the inner control line 40 which extends to a system of three stepped bore portions 80, 87 and 86. The same system of bore portions is shown on a larger scale on the right of FIG. 3. A piston 82 is slidably disposed in portion 80 and, via a conical transition member 83 and a cylindrical neck 84, bears a supporting piston 85. The piston 85 slides in the third bore portion 86 which is of much smaller diameter than portion 80. An annular chamber between the first and third bore portions forms the second portion 87 which communicates with the third portion 86 via a short conical part 89 serving as a valve seat.

Chamber 88 corresponds to the inlet chamber of the valve 18 and to the chamber 34 in FIG. 1*a*. Line 42 thus forms part of line 8 and, together with a portion of line 9, communicates with the chamber 53.

An interrupted bore corresponding to line 8 branches from the middle part of portion 86 (FIG. 2) extends through the flange surface 66 and cover 54 into chamber 4.

A vent bore 90 extends to atmosphere from the top free end of portion 86.

Finally, cover 54 has a tapped blind hole 92 whose base is connected to chamber 4 via a part of line 8 and a short bore corresponding to line 10.

A hollow screw 93 is disposed in hole 92 and cooperates therewith to form the restrictor 22. The base of hole 92 is conical and so is the bottom end of the screw 93. A central bore in the screw 93 bifurcates at the bottom end so that two openings extend into the conical part of the screw. The screw 93 can be screwed to a varying depth into the blind hole to alter the flow cross-section between the conical parts of the hole 92 and screw 93. The restrictor 22 is therefore adjustable.

The servomotor system in FIG. 2 operates as follows: valve lid 60 is in a normal position; in the present case the valve is open. Pressure medium flows at relatively high pressure through inlet 51 and outlet 52. The valve chamber 53 is therefore subjected to pressure. There is a plus signal in line 24 so that current flows in d.c. coil 72 and armature 76 is attracted to the right. Valve spindle 74, overcoming the force of spring 78, rests on its seat and thus closes line 11. The pressure in chamber 6 is the same as in valve chamber 53, since chamber 6 communicates with chamber 53 via line 9 and restrictor 20.

The pressure in chamber 53 is also operative on piston 82 in the chamber of portion 80 below piston 82 and in the annular chamber 88. The pressure on piston 82 is balanced via an imaginary annular surface having the diameters of portions 86 and 80. However, there is an upwardly acting pressure difference on an imaginary circular surface having the diameter of portion 86 since the free top end of piston 85 is at atmospheric pressure whereas the free end face of piston 82 is at the pressure in chamber 6, which is equal to the pressure in chamber 53. The conical transition member 83 therefore engages valve seat 89, and closes line 8. Chamber 4 communicates with atmosphere via the restrictor 22 and is therefore at atmospheric pressure. As a result of the pressure difference across piston 2, the piston 2 is pushed upwards and rear seat 48 bears in seal-tight manner on the surface 49.

In this normal position, there is no loss of pressure medium, which is sealed at the seat of valve 70, the rear seat 48 of piston 2 and the seat 89 of valve 18. Any clearance at the place where piston rod 56 extends through cylinder end 58 does not impair the seal-tightness of the servomotor system.

When the current to solenoid valve 70 is cut off, e.g. deliberately by a control station or automatically by a safety signal, spring 78 pushes spindle 74 from the seat and pressure medium from chamber 6 flows through line 11 to atmosphere. Since insufficient pressure medium can flow in via restrictor 20, the pressure falls in chamber 6 and in the space under piston 82. Since the annular chamber 88 is still at the full pressure of the medium flowing through the valve chamber 53, piston 82 descends, thus opening the valve cross-section at seat 89. Pressure medium flows through line 8 into chamber 4 and builds up the same pressure as in chamber 53. The resulting pressure difference across piston 2 accelerates the piston 2 downwards and lid 60 engages valve seat 64 to close the valve.

In this state, pressure medium is lost from chamber 53 via line 42, the open valve 18, line 8 and restrictor 22 to atmosphere and via line 9 and restrictor 20 and parallel thereto via the guide of piston rod 56 at cylinder end 58 into piston chamber 6 and thence via line 11 to atmosphere. There is also a slight leakage from annular chamber 88, along piston 85 to atmosphere. The leakage along piston 2 from chamber 4 to chamber 6 is practically negligible. A disadvantage of these leaks is that the leaks can wear away the material. Accordingly, the servomotor system is designed to ensure good flow conditions in the ducts and components and suitable corrosion-resistant materials are used. Since the servomotor system remains only a short time in the described bottom position, any wear of material caused by the aforementioned flow conditions is not a serious problem.

In many cases it will be advantageous to combine the outlets to atmosphere, namely the outlet of line 11, of line 10 or restrictor 22 and of bore 90, either inside the servomotor system as shown in FIG. 2 or outside said system via lines in a common duct and supplied to a separate pressure medium sink, e.g. a condenser.

This is especially important if the pressure medium has any form of impurity or if an impurity cannot be eliminated with absolute certainty. Advantageously, in such cases, the sink has a filter.

In FIG. 2, the control valve 18 serves the same purpose as the second control valves 18 in examples a, c, e and g in FIG. 1 but is simplified since there is no rod 32 in contact with atmosphere, which would require sliding seals, e.g. glands. In the same manner as valve 18 in FIG. 2, which like the valve 18 in FIG. 1*a* is near the pressure medium source 13, the control valves 18 in embodiments b, d, f and h of FIG. 1 which are disposed near the sink 14 can be of simplified construction, as explained hereinafter, so that no rod 32 contacts the atmosphere.

Figure 3:
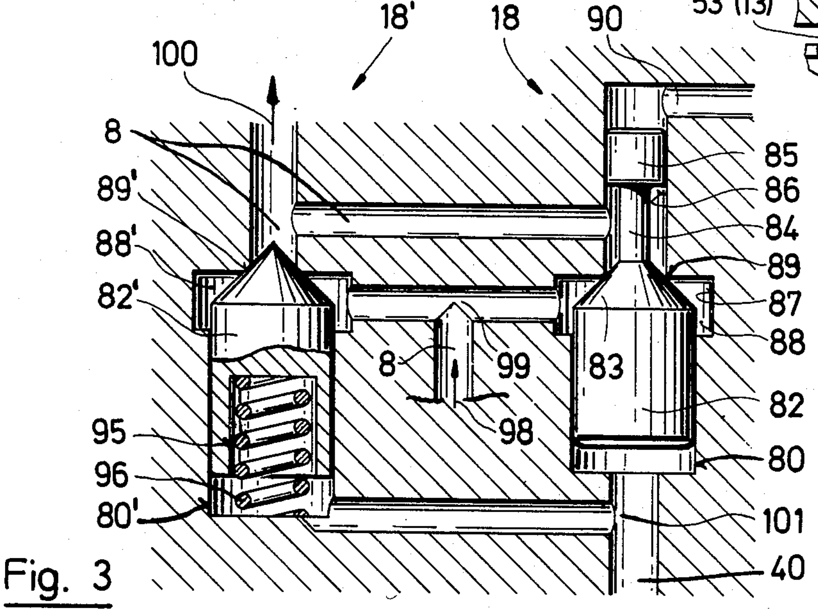
FIG. 3 illustrates an axial sectional view of a modified second control valve in accordance with the invention.

Another important modification of valves 18 is shown on the left of FIG. 3 in the case of a control valve 18′ adjacent the pressure-medium source. In FIG. 3, piston 82′ does not have a neck 84 or supporting piston 85 but instead has an axial blind bore 95 and a spring 96 which bears against the base of the first bore portion 80′. This embodiment of the second control valve 18′ has the advantages of simple construction and of omission of a vent bore 90 and of a piston 85 and a third guiding bore portion. Piston 85 and the last-mentioned bore portion, since they must extend coaxially of piston 82 or portion 80, would have to be machined with great accuracy.

To increase the reliability of the servomotor system it may be advantageous to provide redundancy. In the embodiment in FIG. 2 or in a,b,e and f in FIG. 1, for example, the second control valve 18 can be duplicated and disposed in two parallel connecting lines 8. In many cases, the first control valve 16 will also be duplicated, in which case the two valves 16 will be disposed in parallel.

FIG. 3 shows a redundancy circuit of two control valves 18, 18′ corresponding to the embodiment in FIG. 2. The end of line 8 denoted by an entry arrow 98 bifurcates at point 99 and leads to annular chambers 88, 88′. The chambers 88, 88′ merge into conical parts 89, 89′ forming valve seats, after which the two parallel branches combine to form line 8 in the bore portion denoted by an outlet arrow 100.

The internal control line 40 bifurcates at point 101 and extends therefrom to the bottom ends of the first bore portions 80 and 80′.

The redundant system in FIG. 3 operates as follows:

When the first control valve 16 is closed and consequently the pressure of source 13 is applied to line 40, piston 82 rests on valve seat 89, as already described in conjunction with FIG. 2. At the same time, piston 82′ is in engagement with its valve seat 89′ since spring 96 prevails over the practically balanced pressures at piston 82′. Consequently, the two parallel paths of line 8 are closed.

When the pressure falls in line 40 because of the first valve 16 opening, first one and then the second of the two parallel valves 18, 18′ opens, depending on the diameters of pistons 82, 82′ and piston 85 and the force of spring 96. The influence of the first opening piston on the opening moment of the second opening piston is practically negligible.

The use of two different second control valves increases the expense of the construction but gives additional redundancy because two different principles of operation are at work.

When control valve 18 is open in the normal position of the piston 2, as shown in cases c, d, g and h in FIG. 1, redundancy is produced by connecting a pair of valves 18 in series instead of in parallel. Similar considerations apply to the first control valve 16.

The system in FIG. 2 has the special advantage that if the servomotor system is subjected to external influences, for instance, if line 24 or valve 70 is destroyed or even if, as a result of the destruction of valve 70, spindle 74 is torn off, the servomotor and consequently the valve move into the safety position.

Depending on the operating conditions under consideration, it may be advantageous to provide more than one pressure medium source and, if required, more than one sink. In such case selector circuits can be chosen so that the pressure medium source at the highest pressure and the sink at the lowest pressure are used in each case. In the case, for example, of valves controlled by their own medium, the pressure medium source may alternatively be a place under the valve seat and/or an auxiliary source, e.g. an auxiliary steam generator.

Figure 4:
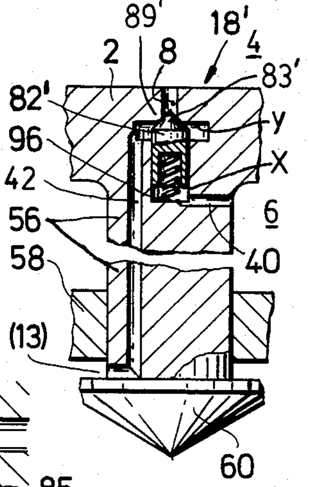
FIG. 4 illustrates a part of a piston and rod with a control valve in accordance with the invention.

A particularly elegant solution for the second control valve is shown in FIG. 4, where valve 18′ is disposed completely in piston 2 or in piston rod 56. In this embodiment line 8 does not have to extend through the flange surface 66. Of course, valve 18′ in FIG. 4 can be combined with a valve 18 in FIG. 2 to obtain redundancy.

As indicated in FIG. 4, the second control valve 18′ has a lid 83′ for seating on a valve seat 89′ as well as a piston 82′ connected to the lid 83′ and having a pressure surface X operative in a lid-closing direction and communicating via a line 40 with the chamber 6 connected to the first control valve 16 (see FIG. 2). This piston 82′ has a pressure surface Y on the lid side which is connected via a line 42 to the pressure medium source 53 (13) and a line 8 extending from the valve seat 89′ and connected to the other piston chamber 4. A means in the form of a spring 96 is also provided for biasing the lid 83′ in a closing direction against the valve seat 89′.

Figure 5:
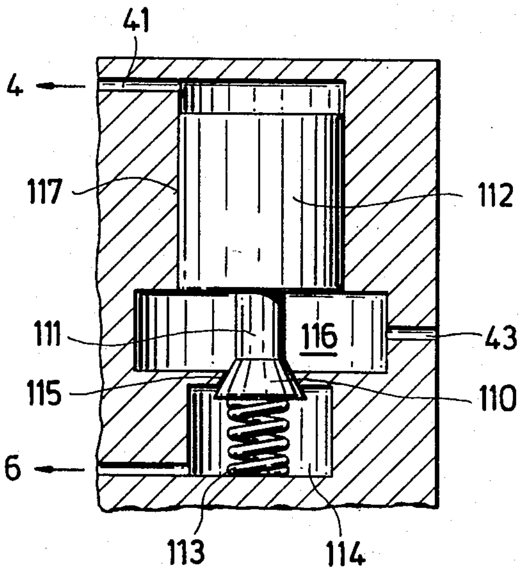
FIG. 5 illustrates a modified control valve constructed in accordance with the invention.

The previously-mentioned simplified second control valve usable in the example in FIG. 1b is constructed, for instance, as shown in FIG. 5.

A conical lid 110 is secured via a short neck 111 to the bottom end face of a cylindrical piston 112, which is near the thinner end of the lid 110. The lid bears via a pressure spring 113 on the base of an outlet chamber 114 connected to cylinder chamber 6. The outlet chamber 114 ends in a seat 115 on the conical surface of the lid 110. The other side of the seat 115 is adjacent an annular chamber 116 communicating via line 43 with the pressure-medium sink. The annular chamber 116 merges into a guide bore 117 for the piston 112, which bore is closed at the top and communicates via line 41 with chamber 4.

As previously shown, the servomotor system is adapted to bring the piston into a top or a bottom end position and to hold the piston there. If required, the piston can be brought to and held in an intermediate position. For this purpose, a position pick-up is disposed on the piston and transmits a position signal which is subtracted from a set value signal transmitted by the control station. The resulting deviation is transmitted to the first control valve 16, preferably via an insignal-action controller. In a servomotor system of this kind, piston 2 hunts fairly rapidly around the desired intermediate position.

To obviate hunting, valves 16, 18, instead of being on-off valves, can be valves adapted to take up intermediate positions depending on the input signal.

Fixed restrictions can be provided instead of the adjustable restrictors 20 and 22.

The invention thus provides a servomotor system which is of simplified design and which can be actuated via a single line.

What is claimed is:

1. A pressure medium actuated servomotor system comprising a cylinder;

a piston slidably mounted in said cylinder to divide said cylinder into two chambers;

a first line communicating one of said chambers with a pressure medium source;

a second line communicating said one chamber with a pressure medium sink;

a third line communicating the other of said chambers with said pressure medium source;

a fourth line communicating said other chamber with said pressure medium sink;

a first control valve in one of said first and said second lines;

a first restrictor in the other of said first and said second lines;

a second control valve in one of said third and said fourth lines;

a second restrictor in the other of said third and fourth lines;

an external control line connected to one of said control valves; and an internal control line communicating the other of said control valves with said chamber communicating with said one control valve for actuation of said other control valve with pressure medium from said chamber communicating with said one control valve.

2. A system as set forth in claim 1 wherein one chamber communicates via one control valve with said pressure medium source and the other chamber communicates via the other control valve with said pressure medium sink.

3. A system as set forth in claim 2 wherein said piston includes a rear seat on one side for seating on a cover of said cylinder.

4. A system as set forth in claim 1 wherein said one control valve is in a normally closed position when said system is in a normal position.

5. A system as set forth in claim 1 wherein said one control valve is connected to said pressure medium sink.

6. A system as set forth in claim 1 wherein said second control valve is disposed within a wall of said cylinder.

7. A system as set forth in claim 1 which further comprises a valve casing having said cylinder and a valve chamber defining said pressure medium source therein, a valve seat in said valve chamber, a piston rod secured to said piston and passing into said valve chamber and a lid secured to said rod within said valve chamber for selectively seating on said valve seat to close said valve chamber.

8. A system as set forth in claim 7 wherein said valve housing includes a feed line for conveying a pressure medium and connecting said valve chamber with one of said chambers.

9. A system as set forth in claim 1 wherein said second control valve has a lid for seating on a valve seat; a piston connected to said lid and having a pressure surface operative in a lid-closing direction and communicating with said chamber connected with said first control valve, said piston having a pressure surface on the lid side connected to said pressure medium source; a line extending from said valve seat and connected to said other piston chamber; and means for biasing said lid in a closing direction against said valve seat.

10. In combination, a valve having a casing including an inlet connection, an outlet connection and a valve chamber between said connections and a lid in said chamber for closing of at least one of said connections; and a servomotor system for actuating said valve, said system including a cylinder in said casing, a piston movably mounted in said cylinder to divide said cylinder into two chambers and connected to said lid for movement therewith, a first line communicating one of said cylinder chambers with said valve chamber, a restrictor in said first line, a second line communicating said one chamber with atmosphere, a first control valve in said second line for controlling a flow of medium therethrough, a control line connected to said control valve to transmit a control signal therethrough, a third line communicating the other of said cylinder chambers with atmosphere, a restrictor in said third line, a fourth line communicating said valve chamber with said third line, a second control valve in said fourth line for controlling a flow of medium therethrough, and an internal control line between said first line and said second control valve for subjecting said second control valve to the pressure of a medium in said valve chamber when said first control valve is closed and to a reduced pressure when said first control valve is opened whereby said second control valve is actuated to open said fourth line in response to opening of said first control valve.

11. The combination as set forth in claim 10 wherein each restrictor is adjustable.

* * * * *

UNITED STATES PATENT AND TRADEMARK OFFICE

CERTIFICATE OF CORRECTION

PATENT NO. : 4,513,943

DATED : April 30, 1985

INVENTOR(S) : Steffan P. Russak

It is certified that error appears in the above-identified patent and that said Letters Patent is hereby corrected as shown below:

Column 3, line 32 after "valve" insert -16-

Column 9, line 31 change "an insignal- to --an integral-

Signed and Sealed this

*Eighth* Day of *October 1985*

[SEAL]

*Attest:*

DONALD J. QUIGG

*Attesting Officer*

*Commissioner of Patents and Trademarks—Designate*